W. A. F. McCALLUM.
ANTISKIDDING TREAD FOR MOTOR VEHICLE WHEELS.
APPLICATION FILED JULY 13, 1907.

906,054.

Patented Dec. 8, 1908.

WITNESSES:

INVENTOR
Wm. A. F. McCallum,
BY
ATTORNEY.

UNITED STATES PATENT OFFICE.

WILLIAM A. F. McCALLUM, OF GERMANTOWN, PENNSYLVANIA.

ANTISKIDDING TREAD FOR MOTOR-VEHICLE WHEELS.

No. 906,054.  Specification of Letters Patent.  Patented Dec. 8, 1908.

Application filed July 13, 1907. Serial No. 383,640.

To all whom it may concern:

Be it known that I, WILLIAM A. F. MC-CALLUM, a citizen of the United States, residing at Germantown, in the county of Philadelphia and State of Pennsylvania, have invented certain new and useful Improvements in Antiskidding Treads for Motor-Vehicle Wheels, of which the following is a specification.

The principal object of my invention is to provide an anti-skidding or slipping device for motor vehicle-wheels, comprising sectional hinged or linked devices interposed between the pneumatic portions of the tires and the tread portion of the shoes embracing the tires, and which device while of metal is flexible or yielding, in its arranged application and also provided with points or prongs which are arranged to be embedded in the material of the tire shoe in the formation thereof and projecting to the exterior tread surface of the shoe to present such a biting or frictional engaging surface in the travel of the tires of the wheels of the vehicle in contact with the ground as to offer required resistance to slippery and damp ground or asphalt pavements so as to effectually prevent more particularly skidding as well as slipping of the tires under the carrying load and impelling power of the vehicle.

Figure 1:
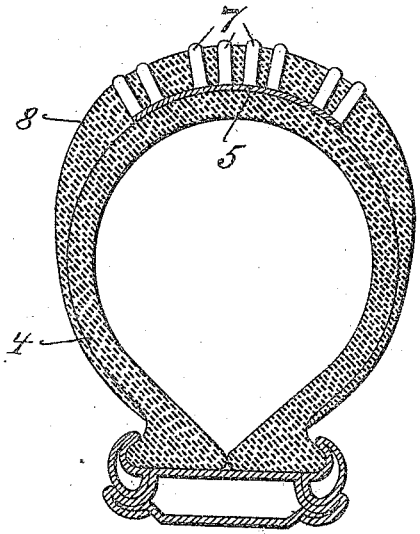
Figure 2:
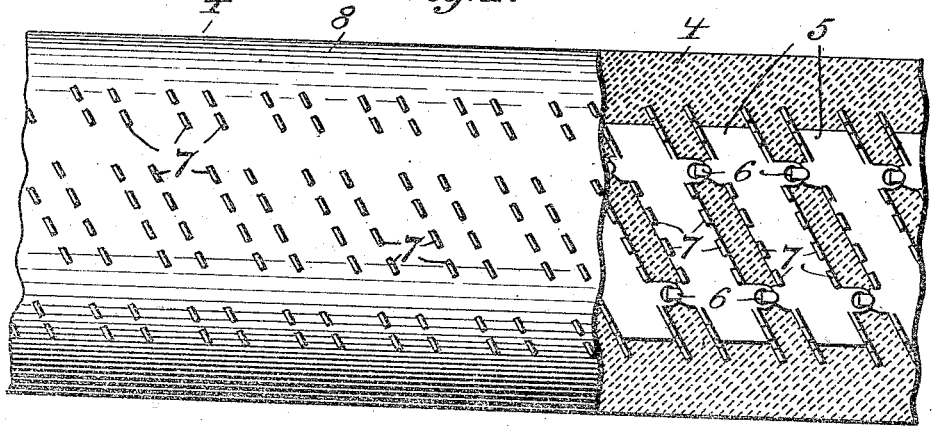
Figure 3:
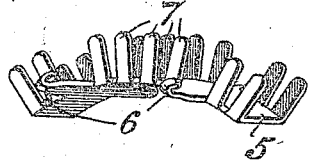

The nature and characteristic features of my invention will be more fully understood from the following description taken in connection with the accompanying drawings forming part hereof, in which Figure 1 is a transverse sectional view through a motor vehicle wheel, showing the pneumatic portion of the tire and the particular anti-skidding and slipping device of my invention interposed between the tire and shoe thereof and provided with prongs or points embedded in the body of the shoe material and so as to project to the exterior tread surface of the same and to compass only the tread portion thereof. Fig. 2 is a view partly in plan and partly in broken section, showing the anti-skidding and slipping sectional device of my invention in application to the wheel tire as a structure, for employment in connection with motor vehicle-wheels; and Fig. 3 is a perspective of one section of the said device detached from the harbor therefor, between the tire proper and the applied shoe or tread portion thereof, showing the detached arrangement as to one section of the said device.

Referring to the drawings 4, is the tire proper, arranged so as to be inflated and of any ordinary construction.

5, is the device of my invention, consisting of a series of substantially trough-shape sections of metal linked or hinged at 6, to each other, preferably at some distance from each end of adjoining sections, as clearly shown in the broken section part of Fig. 2. Each of the sections has struck up from each side a series of prongs or points 7, at suitable distances apart, so that when the device is interposed between the tire proper 4, and the shoe 8, of rubber composition or other gritty substance, the material of the shoe 8, which really forms the tread portion of the wheel, will be thoroughly and uniformly embedded in and about the points or prongs 7, as clearly shown in Fig. 1, and also so that these points will extend to the exterior engaging tread portion of the shoe 8, with the ground or pavement to offer required resistance to motor vehicle-wheels due to the character of such points or prongs so as to prevent slipping or skidding over wet ground or asphalt pavements under the load and impelling power of the motor-vehicle. These points or prongs may be arranged so as to flare from one another from the base of the sections hinged or linked to each other but they are preferably arranged as shown.

The series of sections of the device 5, are arranged diagonally as to position between the tire 4 and shoe 8, as clearly shown in Fig. 2. Such arrangement of the sections, as described enables the tread to give or yield under the carrying load and the impelling power of the vehicle, uniformly and in unison the interposed sections of the device and the effect of the points or prongs 7, projecting to the tread surface of the shoe of the wheel renders effective thereby, the purpose for which my invention has been designed, in application to the wheels of particularly motor-vehicles, of slipping and skidding to be reduced to a minimum.

Having thus described the nature and objects of my invention, what I claim as new and desire to secure by Letters Patent is:—

1. A motor vehicle-wheel, comprising an inflatable tire, a tread or shoe, and an anti-skidding and slipping device, consisting of a series of sections hinged or linked to each other and each provided with prongs or points, said device interposed between the tire and shoe or tread and embedded in the latter so that the prongs or points of the respective sections of the device extend to the exterior surface of the shoe or tread of the wheel, substantially as and for the purposes described.

2. A motor vehicle-wheel, comprising a tire, a tread applied thereto and an anti-skidding and slipping device, consisting of a series of sections hinged or linked to each other and prongs or points at suitable distances apart formed integral therewith and said device arranged diagonally to the plane of the tread or shoe portion of the wheel and between the tread and tire and embedded in the body of the tread and the points or prongs projecting to the exterior surface of said tread, substantially as and for the purposes described.

In witness whereof, I have hereunto set my signature in the presence of two subscribing witnesses.

WILLIAM A. F. McCALLUM.

Witnesses:
   J. WALTER DOUGLASS,
   THOMAS M. SMITH.